Figure 1:
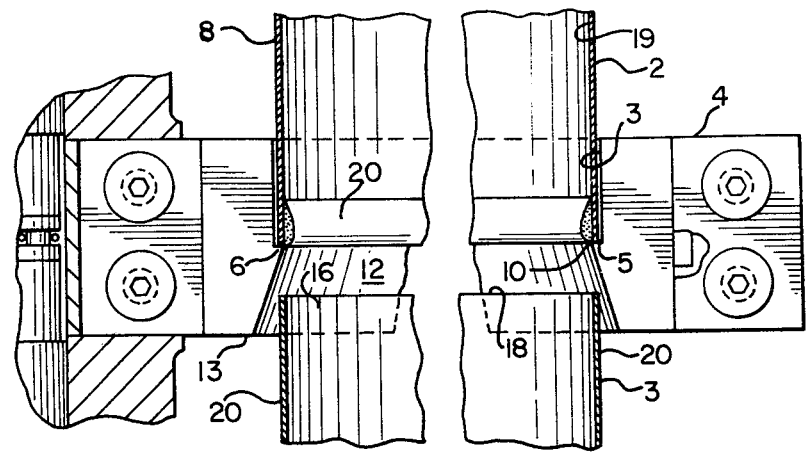

United States Patent [19]
Gordon

[11] 4,280,268
[45] Jul. 28, 1981

[54] ADHESIVE APPLICATION OF TWO-PART CONTAINER

[75] Inventor: Gerald Gordon, Skokie, Ill.

[73] Assignee: The Continental Group, Inc., Stamford, Conn.

[21] Appl. No.: 170,195

[22] Filed: Jul. 18, 1980

Related U.S. Application Data

[62] Division of Ser. No. 54,780, Jul. 5, 1979.

[51] Int. Cl.³ .............................................. B23P 11/02
[52] U.S. Cl. ........................................ 29/446; 29/458; 29/469.5; 156/165; 156/198; 156/294; 220/3; 220/4 B; 220/8; 220/76; 403/282
[58] Field of Search ................ 156/198, 294, 165; 29/469.5, 446, 458, 451, 450, 523, 525, 235, 252, 280; 285/382; 220/3, 4 B, 8–76; 403/282

[56] References Cited

U.S. PATENT DOCUMENTS

| | | | |
|---|---|---|---|
| 2,113,060 | 4/1938 | Sandberg | 220/76 |
| 3,018,914 | 1/1962 | Webster | 220/3 |
| 3,024,936 | 3/1962 | Logue | 220/3 |
| 3,181,589 | 5/1965 | Phelps | 220/3 |
| 3,208,136 | 9/1965 | Joslin | 29/458 |
| 3,347,728 | 10/1967 | Preotle et al. | 29/458 |
| 3,462,825 | 8/1969 | Pope et al. | 29/451 |
| 3,487,534 | 1/1970 | Schustack | 29/235 |
| 4,006,838 | 2/1977 | Baumann et al. | 220/3 |
| 4,124,422 | 11/1978 | Kusano | 29/451 |
| 4,124,928 | 11/1978 | Stark | 29/451 |

FOREIGN PATENT DOCUMENTS 549046  7/1956  Belgium ................................ 156/294

*Primary Examiner*—Jerome W. Massie
*Attorney, Agent, or Firm*—John J. Kowalik

[57] ABSTRACT

A container and method of adhesive bonding of two telescopic container halves wherein each container half has a cylindrical body, the inner container portion being circumferentially loaded to temporarily reduce its diameter and being forced in centered relation to the outer portion into a bead of adhesive laid in the interior of the outer portion to coat the raw edge on the inner portion, the inner portion shearing through the adhesive without wiping it off from the interior of the inner portion and thereafter the hoop stress on the inner portion being relieved so it springs out and squeezes excess bonding material from between the inner and outer portion and thus obtains thin film adhesive bond with good stress shear characteristics while holding the film in compression therebetween during curing or setting of the adhesive.

6 Claims, 2 Drawing Figures

ADHESIVE APPLICATION OF TWO-PART CONTAINER

This application is a division of U.S. Application Ser. No. 54,780, filed July 5, 1979.

BACKGROUND OF THE INVENTION

This invention relates to containers which are made of two halves and telescoped one into the other and secured by an adhesive.

Various problems occur in obtaining an adequate seal. Attempts have been made by merely coating the exterior edge portion of the inner container portion or the interior edge portion of the outer container portion. The two halves would then be telescoped. However, during the insertion movements the edge of the uncoated portion would scrape off the coating from the coated portion and the residue remaining would not in each instance be sufficient to provide a bond of required integrity.

DISCUSSION OF THE PRIOR ART

In the prior art known to applicant, the bonding of telescoped container halves usually involves a welding or brazing of the metal parts. Adhesive bonding as heretofore described is also known but joining by adhesives of such juncture in the manner hereinafter described is believed to be new and novel. Merely placing an adhesive on the interior or exterior of the inner or outer cylindrical shaped halves has been tried as heretofore mentioned and found wanting.

SUMMARY OF THE INVENTION

This invention is directed to a novel method and apparatus for joining the two container sections in a joint in which the adhesive not only covers the raw edge of the inner section but also is quite uniformly spread in the overlap between the sections.

A broad object of the adhesively bonded invention is to provide an improved lap joint between the upper and lower portions of the can in which the adhesive is properly located to provide an integral joint.

A more specific object is to provide a novel apparatus and method of forming the joint in which the adhesive is laid as a thick bead within the outer portion of the can adjacent to its open edge and the inner portion of the can is squeezed circumferentially to reduce its diameter and then more or less loosely forced into the outer container portion through the thick bead thus burying the raw edge of the inner portion and without scraping the inner side of the outer portion whereby the adhesive is substantially uniformly spread about the outer circumference of the inner portion, the adhesive preferably being a vinyl plastisol material which solidifies on being heated after the can portions are mated. The can portions are released when telescoped and the inner container portion expands and compresses the trapped adhesive and thus maintains intimate pressed contact between the parts so that they adequately bond with the adhesive as it cures or sets. Suitable adhesive materials for bonding the two can portions together can be any known materials having adhesive properties including vinyl plastisols, thermosetting epoxy resins and thermoplastic resins such as polyethylene, polypropylene. Other adhesive materials include vinyl plastisol formulations, carboxylated polyolefin resins and especially carboxylated polypropylene resins of the type disclosed in U.S. Pat. No. 3,616,047.

Figure 2:
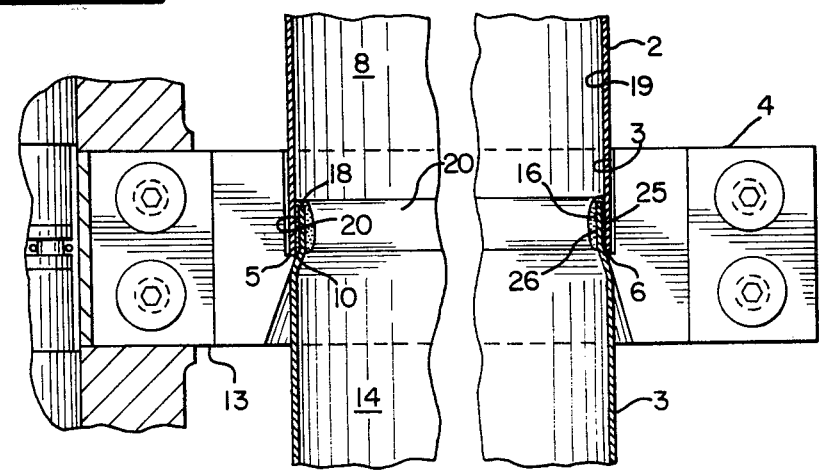

These and other objects and advantages inherent in and encompassed by the invention will become more apparent from the specification and the drawings, wherein:

FIG. 1 is an axial sectional view through the apparatus and container portions showing the parts preparatory to being joined; and FIG. 2 is the same section showing the parts joined.

DESCRIPTION OF THE INVENTION

In FIGS. 1 and 2 there are shown two can halves 2 and 3 which are assembled as discussed in U.S. patent application Ser. No. 40,354 filed May 5, 1979. The upper can section 2 fits into a cylindrical bore 3 in a die assembly 4 and has its lower edge 5 seated upon an inwardly projecting shoulder 6. The bore 3 is of a diameter slightly larger than the outer diameter of the cylindrical body portion 8 of can section 2 which complementally fits into the bore 3.

The shoulder 6 extends radially inwardly of the inner surface of the upper can body 8 and defines an apical guide edge 10 with a frusto conical guide surface 12 open through the bottom side 13 of the die member 4.

The lower can body 14 is inserted into the guide 16 and is forced upwardly against the constricture imposed by the upwardly converging guide surface 12 which slightly compresses the open edge portion 16 of the can body 14.

The raw edge 18 of the inner or lower can body 14 is forced into the bead of adhesive 20 which may be vinyl plastisol or an epoxy. The adhesive material 20 is laid onto the interior side of the upper container body adjacent to its lower edge and if it is of thermoplastic material it is heated so that the edge portion 16 may be forced into it.

It will be noted that the guide edge 10 causes the outer side 20 of the inner edge portion 16 to be spaced radially inwardly from the inner side 19 of the upper portion so that the adhesive is not scraped off by the edge 18 as it is inserted into the upper can body but a predetermined band layer 24 of adhesive material remains in the space 25 and also some of the adhesive material flows over the interior side 26 of the inner upper edge portion 16. When the telescoped container portions are released by opening the die assembly, the inner edge portion 16 springs outwardly and compresses the adhesive material against the overlapping portion of the outer container section. The adhesive is thus compressively held between the two can parts and excess material is squeezed out so that an excellent thin adhesive bond is obtained which is stressed in shear when the container is filled with pressurized beverages for which this container is primarily intended and the gasses load the ends axially.

Thus apparatus and method of bonding the two can portions has been achieved which not only covers the raw edge of the inner section but also arranges the parts in a manner to obtain adequate adhesive at the interface and also the parts cooperate to squeeze out excessive adhesive material so as to obtain a good adhesive bond by utilizing the spring-back of the material which is preferably aluminum alloy of known kind such as H19-3004 of about 6–8 mils in thickness although it is also contemplated that steel materials could be used.

Having described a preferred embodiment of the invention, it will be understood that various modifications will now be apparent to those skilled in the art which are encompassed by the appended claims.

I claim:

1. A method of bonding a pair of container sections end to end wherein each section has a metal thin-walled cylindrical body with an open end defined by an end portion having a raw edge comprising:

applying a bead of adhesive material of predetermined width on the interior side of the edge portion of one of said sections, and inserting the other section into said one section while applying a hoop stress to the end portion of said other section to reduce the diameter thereof to slightly less than the internal diameter of said one section, imbedding said end portion of said other section within said bead of adhesive while maintaining said end portion of the other section in radially spaced relation to said end portion of said one section to provide clearance therefrom and thereby leaving a film of adhesive material of predetermined thickness between the external side of the edge portion of the other section and the internal side of the edge portion of the one section, and then releasing the hoop stress on said end portion of said other section to cause excess bonding material to be squeezed out from therebetween and leaving a thin coating of said material therebetween.

2. The invention according to claim 1 limiting the extent of insertion of said end portion of the other section to less than the band width of said bead to thereby bury the raw edge of the other section within said adhesive material.

3. The invention according to claim 1 wherein said hoop stress limited to a factor within the elastic limit of the material of said end portion to essentially prevent permanent set thereof.

4. The invention according to claim 1 wherein said raw edge is imbedded within the adhesive and said adhesive is caused to cover the interior side of said end portion of said other section.

5. The invention according to claim 1 and said sections being made of aluminum.

6. The invention according to claim 1 and said sections being 6–11 mils thick.

* * * * *